United States Patent [19]
Reisch et al.

[11] Patent Number: 5,481,536
[45] Date of Patent: Jan. 2, 1996

[54] METHOD FOR RESTORING A PRESCRIBED SEQUENCE FOR UNORDERED CELL STREAMS IN ATM SWITCHING TECHNOLOGY

[75] Inventors: Michael Reisch, Kempten; Klaus Ziemann, Germering, both of Germany

[73] Assignee: Siemens Aktiengesellschaft, Munich, Germany

[21] Appl. No.: 303,837

[22] Filed: Sep. 9, 1994

[30] Foreign Application Priority Data

Oct. 29, 1993 [DE] Germany .......................... 43 37 095.0

[51] Int. Cl.⁶ ................................................... H04J 3/26
[52] U.S. Cl. ........................................ 370/60.1; 370/94.1
[58] Field of Search ........................ 370/60, 60.1, 94.1, 370/94.2

[56] References Cited

U.S. PATENT DOCUMENTS 5,127,000  6/1992  Henrion ..................................... 370/60
5,253,251  10/1993  Aramaki ..................................... 370/60
5,278,828  1/1994  Chao .......................................... 370/94.1
5,355,372  10/1994  Sengupta et al. ....................... 370/60.1
5,381,407  1/1995  Chao ............................................ 370/60

Primary Examiner—Douglas W. Olms
Assistant Examiner—Min Jung
Attorney, Agent, or Firm—Hill, Steadman & Simpson

[57] ABSTRACT

In the method a generally unordered cell stream (ICS) is supplied to a generally centrally administered cell memory (CM) and is intermediately stored therein. Path identifier/sequence number signals (VPI/SN) are derived from the cells of the supplied cell stream and are supplied to a resequencing controller (RC) wherein addresses (ADR) for addressing the cell memory (CM) are formed such that an ordered cell stream (OOCS) arises at the output of the cell memory. The method is used in ATM switching technology for switching networks wherein cells of a connection traverse the switching network with different running times.

10 Claims, 5 Drawing Sheets

METHOD FOR RESTORING A PRESCRIBED SEQUENCE FOR UNORDERED CELL STREAMS IN ATM SWITCHING TECHNOLOGY

BACKGROUND OF THE INVENTION

Such a method is required, for example, in ATM switching technology (asynchronous transfer mode) for switching networks wherein cells of a connection proceed through the switching network over different paths that usually have different transit times. What is thereby to be understood as a connection is both a virtual path as well as a virtual channel. A cell stream of a respective connection whose cells arrive at the input of the switching network with a strictly ascending sequence number will usually have lost this order at the output of the switching network because of the generally different running times through the switching network. Since a loss of the chronological order of the information is not permitted, the cells for each connection must be sorted such that the cell stream of the respective connection again has an ascending sequence number.

SUMMARY OF THE INVENTION

It is an object of the present invention to provide a method that allows information packets (cells) that belong to different connections and that generally do not have sequence numbers ordered according to size to be sorted to form a stream of cells such that the sequence numbers for each connection are ordered according to size, whereby the required, chronological sequence of the cells is restored due to the sorting of the sequence numbers.

In general terms the method of the present invention is for restoring a prescribed sequence for unordered cell streams in ATM switching technology. In a first step, a generally unordered cell stream is supplied to a cell memory and respectively one cell of this cell stream is intermediately stored in a memory area of the cell memory addressed by an input address. In a second step, a sequence number expected for a connection having a path identifier of the respective cell is read from the sequence number memory and is checked to determine whether or not the magnitude of the difference between the expected sequence number and the sequence number of the respective cell upwardly exceeds a prescribed range value. In a third step, an error handling of the range transgression, an elimination of the cell, and an entry of a set marking bit into a time-exceeding queue ensue insofar as the range value is upwardly transgressed. In a fourth step, the input address is entered into a content addressable memory, the path identifier of the respective cell is entered both into the content addressable memory as well as into the time-exceeding queue, the sequence number of the respective cell is entered into the content addressable memory, and a marking bit that is not set is entered into the time-exceeding queue insofar as the range value is not transgressed. In a fifth step, a path identifier and an appertaining marking bit are read from the time-exceeding queue and a determination is made as to whether or not the marking bit is set. In a sixth step, a current path identifier used for addressing the sequence number memory is set equal to the path identifier from the time-exceeding queue insofar as the marking bit is not set and, otherwise, a new cell cycle is begun in case a further queue is empty or, in case the further queue is not empty, the current path identifier is set equal to a path identifier pending at the output of the additional queue. In a seventh step, an entry is sought in the content addressable memory which has the current path identifier and the appertaining expected sequence number from the sequence number memory and a hit signal is generated when such an entry is present. In an eighth step, an error handling because of a cell loss is implemented, the respective expected sequence number in the sequence number memory is incremented by one and the current path identifier is entered into the further queue when no hit signal is present. In a ninth step, the address from the sought entry in the content addressable memory is read out into an output queue insofar as a hit signal is present, and the respective expected sequence number in the sequence number memory is incremented by one. In a tenth step, a read address is read out from the output queue and is used for addressing a cell of the cell memory to be read out and, subsequently, a new cell cycle is started, if necessary.

Advantageous developments of the present invention are as follows. A number of the entries in the cell memory present for the respective path identifier is stored in the sequence number memory in addition to a sequence number expected for a respective path identifier. In the second step, the number of entries present in the cell memory for the respective path identifier is additionally read out from the sequence number memory. A check is carried out before the fourth step to determine whether the sequence number of the respective cell coincides with the sequence number of the expected sequence number. The fourth step is supplemented in that a count variable for the plurality of accesses to the content addressable memory and the number of the entries in the sequence number memory present for the respective path identifier are incremented by one insofar as this does not apply. The fourth step is replaced in that the respective input address is directly entered into the output queue, a set marking bit is written into the time-exceeding queue, and the respective expected sequence number in the sequence number memory is incremented by one insofar as this applies. As a substitute, the sixth step involves the current path identifier being set equal to the path identifier from the time-exceeding queue insofar as the marking bit is not set and, otherwise, the current path identifier is set equal to the path identifier of the respective cell when the further queue is empty or the current path identifier is set equal to the path identifier pending at the output of the additional queue when the further queue is not empty. The eighth step only occurs when the marking bit is not set. In the ninth step, the marking bit is additionally set at the output of the time-exceeding queue, the number of the entries present in the cell memory for the respective path identifier is deincremented by one and, when the number of entries present for the respective path identifier is greater than or equal to one, the current path identifier is subsequently entered into the further queue. Preceding the tenth step, the count variable for the plurality of accesses to the content addressable memory is incremented by one and, subsequently, the steps 6–9 are repeated until the count variable upwardly exceeds a plurality of maximally possible access to the content addressable memory per cell clock. The tenth step is supplemented in that the count variable is set equal to zero.

The input address is transferred into the output queue and a path identifier of the respective cell is entered into a time-exceeding queue together with a set marking bit insofar as the respective cell is composed of test cell. A path identifier of the respective cell is entered into a time-exceeding queue together with a set marking bit insofar as the respective cell is composed of an empty cell that is not a test cell.

The input address is used both as a write address for the cell memory as well as a write address for the content addressable memory.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
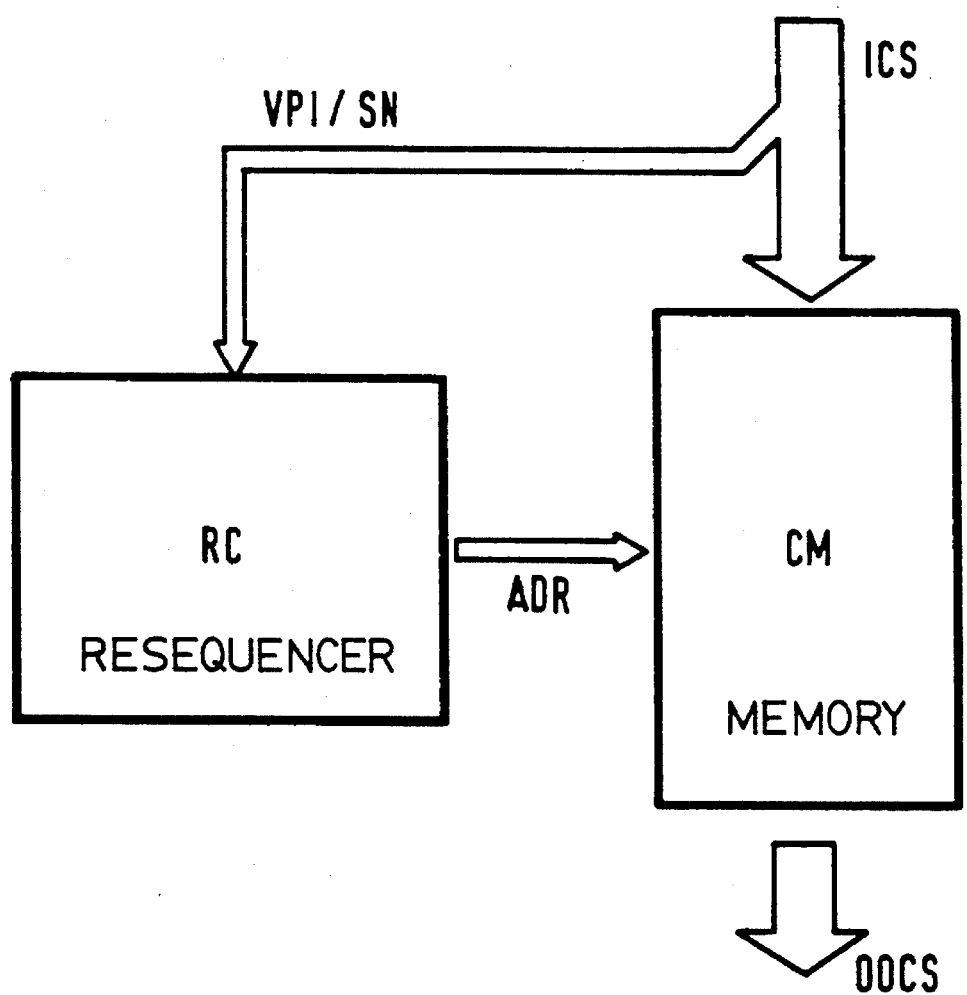
FIG. 1 is a schematic block circuit diagram for explaining the method of the present invention.

FIG. 1 shows a highly schematic block diagram composed of a usually centrally administered cell memory CM and of a resequencer control RC, whereby a generally unordered cell stream ICS is read into the cell memory CM and an ordered cell stream OOCS is in turn read therefrom. A virtual path identifier VPI for a respective connection and a sequence number SN for a specific data cell of the respective connection are derived from cells of the incoming cell stream ICS. Addresses ADR are formed in the resequencer control RC such that an ordered cell steam OOCS is formed from the generally unordered cell stream ICS. The cells leaving the switching network are thereby intermediately stored in the cell memory CM. The resequencing of the cell stream thereby occurs via the control of the write and read events of the central memory.

Let it be assumed for what follows that potentially occurring, redundant cells that, for example, result from a redundantly set up switching network, have already been removed from the cell stream ICS.

Figure 2:
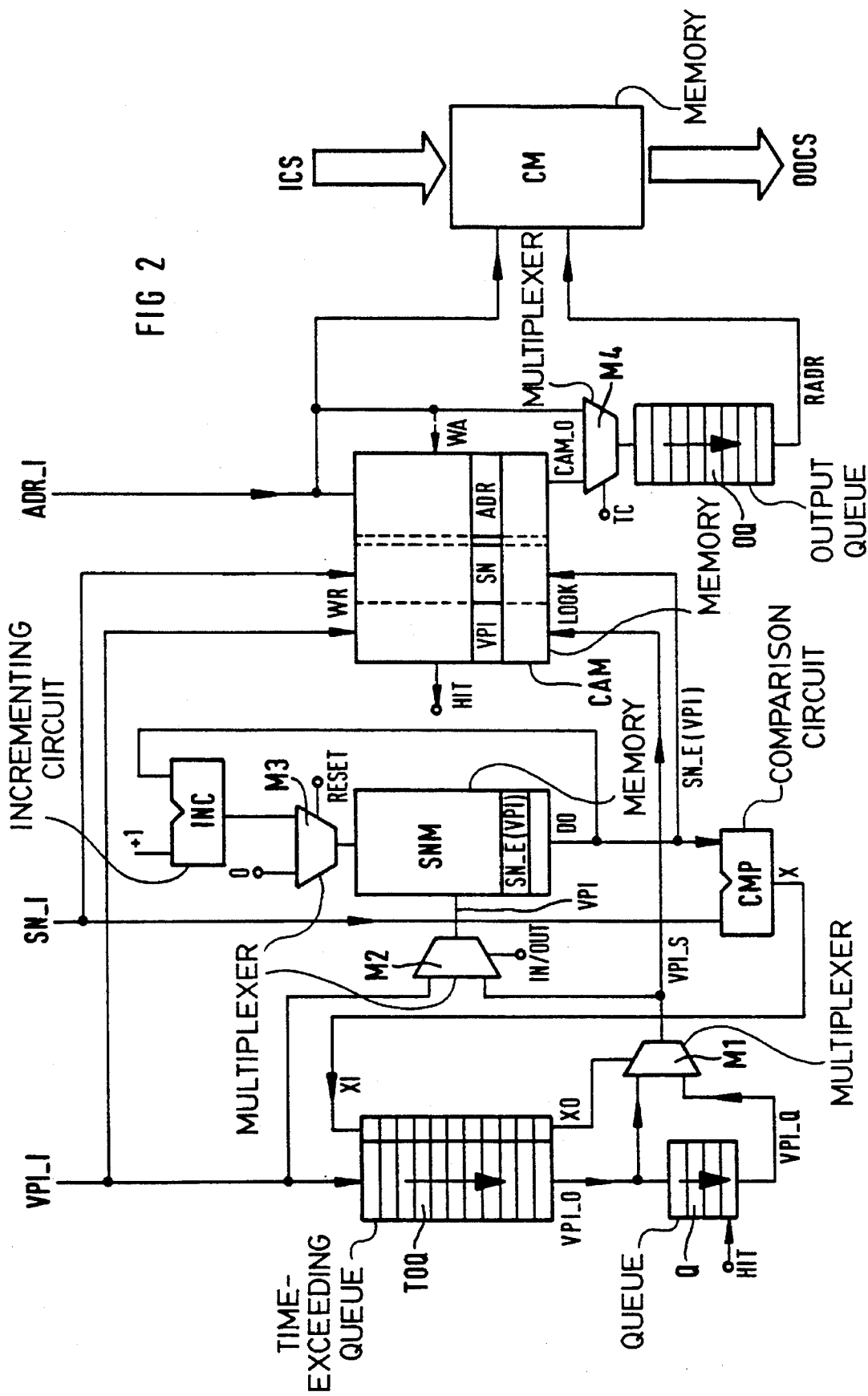
FIG. 2 is a more detailed block circuit diagram for explaining the method of the present invention.

For explaining the method of the present invention, FIG. 2 shows an arrangement required for the implementation of the method. This arrangement is composed of the cell memory CM and of a resequencer control that is shown in greater detail. The resequencer control is thereby essentially a matter of a time-exceeding queue TOQ having a permanently prescribed plurality of entries, of an output queue OQ, of a further queue Q, of a sequence number memory SNM, of an associative memory CAM (content addressable memory), of a comparison circuit CMP, of an incrementing means INC and of multiplexers M1 . . . M4.

The time-exceeding queue TOQ can, due to its constant plurality of elements, be realized, for example, by a shift register, whereby the latter is constructed, for example, of 400 memory elements. The queues OQ and Q are a matter of queues that do not have a permanently prescribed number of elements that, for example, can be dynamically realized by memory elements chained via pointers. The sequence number memory SNM, for example, is addressable by a twelve bit address and thus covers a maximum of 4096 entries of sequence numbers that, for example, are each nine bits wide. Due to the limited bit width of the sequence numbers, for example nine bits, 512 different sequence numbers are possible. For reasons to be set forth later, the content addressable memory CAM must have more elements than the time-monitoring queue TOQ and is composed of 512 elements in this example.

The path identifier VPI_I of a respective cell can thereby be through-connected via the multiplexer M2 to the address input of the sequence number memory SNM as current path identifier VPI. An anticipated sequence number SN_E (VPI) belonging to the respective path identifier can be read out from the sequence number memories SNM onto a data output DO of the sequence number memory SNM and can be compared to the sequence number SN_I of the respective cell using the comparator circuit CMP. The comparison result X is entered with the path identifier VPI_I as marking bit XI at the beginning of the time-exceeding queue TOQ. The sequence number SN E (VPI) anticipated for a path identifier at the data output DO can be respectively incremented by one in the memory SNM via the incrementing circuit INC and can be reset to zero insofar as a reset signal RESET freely pends at the multiplexer M. Since the sequence number memory SNM only enables 512 different sequence numbers here, an incrementation ensues modulo 512. Dependent on the marking bit XO at the output of the time-exceeding queue TOQ, either the path identifier VPI_O at the output of the queue TOQ or the path identifier VPI_Q at the output of the queue Q can be selected as path identifier VPI_S, whereby the path identifier VPI O can be supplied to the input of the further queue Q. Dependent on a control signal IN/OUT, the path identifier VPI_S is also supplied via the multiplexer M2 for addressing the sequence number memory SNM alternatively to the path identifier VPI_I. An input address ADR_I, the path identifier VPI_I and the sequence number SN I are supplied to the content addressable memory CAM as data WR to be written in, whereby the data cell of the content addressable memory respectively addressed by a write address WA is written. The input address ADR_I, for example, is thereby generated in a ring counter and is simultaneously used as write address for the cell memory CM. An address ADR for the path identifier VPI_S and the appertaining, anticipated sequence number SN_E, which pend in common in the content addressable memory CAM as search criteria can be sought (LOOK) in the content addressable memory CAM. When the search is successful, then a hit signal HIT is generated in the content addressable memory CAM and the corresponding address ADR is output at the data output CAM_O of the content addressable memory CAM. The hit signal HIT simultaneously serves as transfer signal HIT for the queue Q. The input address ADR_I can be directly written into the output queue OQ by the multiplexer M4 insofar as a test cell TC is present and the address at the output CAM_O can be entered into the queue OQ insofar as no test cell TC is present. A read address RADR for the cell memory CM pends at the output of the queue QU.

Figure 3:
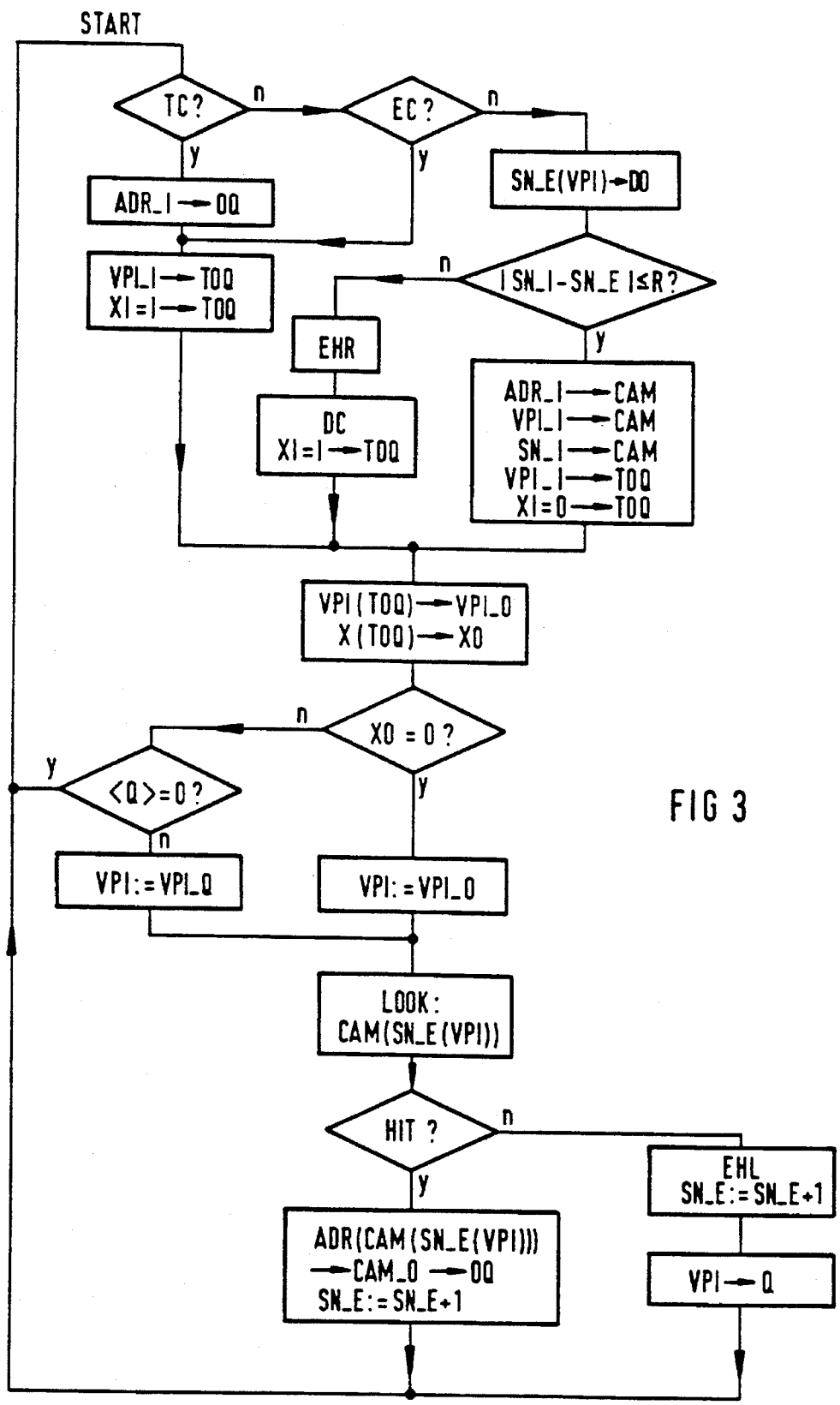
FIG. 3 is a flow chart of the method of the present invention.

FIG. 3 shows a flow chart of the method of the present invention, whereby a check is carried out at the beginning START of a cell cycle to determine whether a test cell TC or an empty cell EC is present. When a test cell TC is present, the input address ADR_I is directly transferred into the output queue OQ and the path identifier VPI_I of the respective cell is entered into the time-exceeding queue TOQ together with a set marking bit XI=I. When an empty cell EC that is not a test cell is present, only the path identifier VP_I of the respective cell is entered into the time-exceeding queue TOQ together with the set marking bit XI=I. A cell thereby exhibits appropriate markings for recognizing a test cell or an empty cell.

After the special treatment of test cells and empty cells, the actual method begins in that an anticipated sequence number of SN_E (VPI) is read from the sequence number memory SNM for a connection having the path identifier VPI_I of the respective cell and is subsequently checked to determine whether or not the magnitude of the difference between the anticipated sequence number SN_E (VPI) and the sequence number (SN_E of the respective cell upwardly exceeds a prescribed range value R. When a range transgression of R is present, a corresponding error handling EHR, an elimination DC of the cell and an entry of the set marking bit XI=I into the time-exceeding queue TOQ ensue. Insofar as, by contrast, no range transgression of R occurs, the input address ADR I is entered in the content addressable memory CAM, the path identifier VPI_I of the respective cell is entered both in the contained addressable memory CAM as well as in the time-exceeding queue TOQ, the sequence number SN_I of the respective cell is entered in the content addressable memory CAM, and a marking bit XI=0 that is not set is entered into the time-exceeding queue TOQ. Subsequently, a path identifier VPI_O and an appertaining marking bit XO are read out from the time-exceeding queue TOQ and a determination is subsequently made as to whether or not the marking bit is set.

When the marking bit XO at the output of the time-exceeding queue TOQ is not set (XO=0), a current path identifier VPI used for addressing the sequence number memory SNM is set equal to the path identifier VPI_O from the time-monitoring queue. Insofar as the marking bit is set (XO=1) and the further queue Q is empty, a new cell cycle is begun. When the marking bit is set and the further queue Q, however, is not empty, the current path identifier VPI is set equal to a path identifier VPI_Q pending at the output of the additional queue Q. As soon as the current path identifier VPI is determined, an entry is sought (LOOK) in the content addressable memory CAM. This entry has the current path identifier VPI and the appertaining, anticipated sequence number SN__E (VPI) from the sequence number memory. The hit signal HIT is generated when such an entry is present. When no hit signal HIT is present, an error handling EHL is implemented because of a cell loss and the respective, anticipated sequence number SN_E (VPI) in the sequence number memory SNM is incremented by one and the current path identifier VPI is entered into the further queue Q. Insofar, however, as a hit signal HIT is present, the respective address ADR (CAM (SN_E (VPI))) is read out from the sought entry in the content addressable memory CAM into the output queue OQ and the respective, anticipated sequence number is identified by one. At the end, a read address RADR is read out from the output queue OQ and is used for addressing a cell to be read out from the cell memory CM. When a further cell is present in the cell stream ICS, a new cell cycle is started.

In order to avoid the risk that cells of a connection are delayed for an inadmissibly long time, a maximum waiting time of, for example, 400 cell clocks is to be defined, whereby the maximum waiting time is dependent on the properties of the respective switching network. When a cell does not thereby arrive within the fixed time interval, then it is treated as being lost (EHL). A determination is made using the sequence number memory SNM and the comparator circuits CMP as to whether the respective cells lie in the proper sequence number range. The provision of such a range is necessary since the sequence number assigning occurs cyclically because of the finite plurality of bits available for the sequence numbers, for example given nine bits modulo 512. For example, a sorting according to ascending sequence numbers occurs for each connection. The time-exceeding queue TOQ serves the purpose of controlling the read-out of cells and indicates that a cell of a connection having the path identifier VPI_I read out from the time-exceeding queue TOQ waited in the cell memory for the maximum difference in running time, that is, for example, 400 cell clocks. The running time through the time-exceeding queue TOQ is thus to be selected equal to the maximally allowable delay due to the switching network. Cells of a connection that have a sequence number SN that arrive with more than the maximum delay after the cell of the same connection having the sequence number SN+1 are no longer considered. The cell having the next sequence number to be read out, that is, having the anticipated sequence number SN_E, must be located in the memory even under worse-case conditions for every connection having the path identifier VPI_O read out from the time-exceeding queue TOQ insofar as no loss of a cell has occurred. When a cell loss is present, the corresponding error handling EHL is implemented. The error handling EHR or, respectively, EHL are merely composed of a corresponding error message in the simplest case. When the input address ADR_I is determined using a ring counter, then it can be assured in a simple fashion that old entries in the cell memory CM and, potentially, entries in the content addressable memory CAM are regularly overwritten. The marking bit XI is set exactly equal to zero when the corresponding cell is to be read out in the cell memory CM, that is, when a valid data cell has been entered. Only the current sequence number, that is, the sequence number SN_E (VPI) to be read out next is deposited in the sequence number memory SNM for every virtual path identifier VPI.

For newly installed connections, sequence numbers beginning with a zero must be assigned at the input of the switching network for every connection, since the sequence numbers in the sequence number memory SNM likewise begin with a zero due to the reset signal RESET. When one forgoes beginning the sequence numbers with zero, then an additional up-date phase must be provided for the sequence number memory SNM, this being basically realizable but involving a comparatively high control outlay. Given a reassumption of operation after an outage or the like, one must proceed in the same way as given a new set up of the appertaining connections.

The output queue OQ is necessary since up to two cells to be read out can occur in a cell cycle, namely a test cell and a data cell to be regularly read out. The further queue Q is required since, given a cell outage, one cell more is entered for the appertaining connection in the content addressable memory CAM or, respectively, in the cell memory CM then there are entries of the appertaining connection in the time-monitoring queue TOQ. The further queue Q is only utilized in the cell cycles for a search in the content addressable memory wherein an access to the content addressable memory is free. This is the case either when a test cell whose input address ADR_I is directly written into the output queue OQ is written in or when a path identifier VPI_O having a set marking bit XO=I is read from the time-exceeding queue TOQ.

Figure 4:
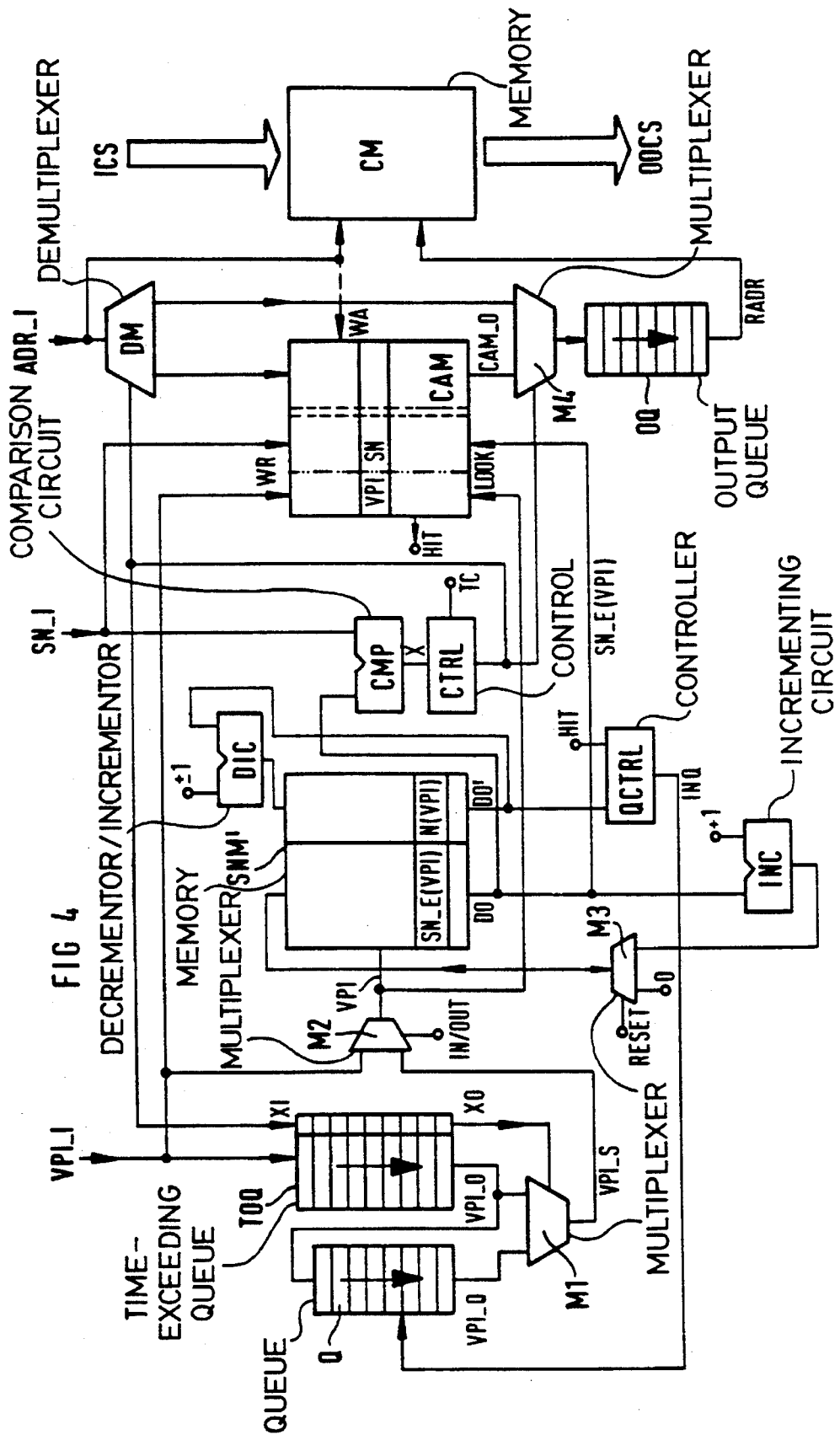
FIG. 4 is a more detailed block circuit diagram for explaining a development of the method of the present invention.

FIG. 4 shows a simplified block circuit diagram for explaining a development of the method of the present invention and corresponds to the block circuit diagram shown in FIG. 2 except for the modifications set forth in greater detail below.

First, there is an important difference in that the sequence number memory SNM is replaced by a sequence number memory SNM wherein the plurality N (VPI) of entries present in the cell memory CM for the respective path identifier VPI is respectively stored for a sequence number SN_E (VPI) anticipated for a current path identifier VPI. Using a decrementor/incrementor unit DIC, a respectively plurality N (VPI) respectively pending at the data output DO' can, as needed, be either respectively deincremented or incremented by one in the sequence number memory SNM'. Further, a controller unit QCTRL is provided for controlling the further queue Q, this controller unit QCTRL forming an acceptance signal INQ for the further queue Q dependent on signals at the data output DO' of the sequence number memory SNM' and dependent on the hit signal HIT. Further, the input address ADR_I can be either entered into the content addressable memory CAM via a demultiplexer DM or, as shown in FIG. 2, can be entered in the output queue OQ via the multiplexer M4. The demultiplexer DM, the multiplexer M4 and the input for the marking bit XI are driven by the output signal of what is referred to as a bypass controller CTRL. As input signal, the bypass controller receives the output signal of the comparator circuit CMP and a signal that signalizes the appearance of a test cell TC.

Figure 5:
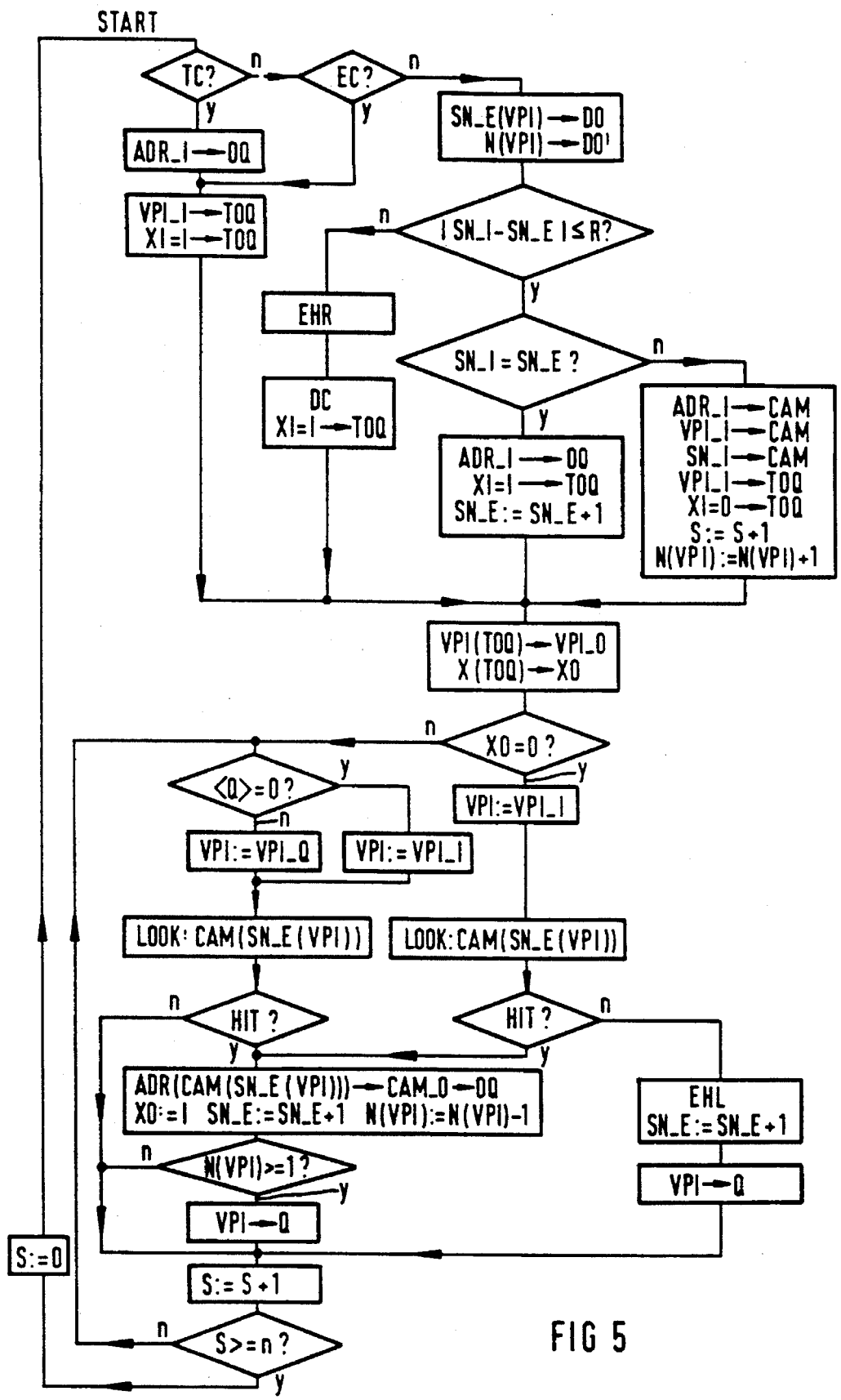
FIG. 5 is a flow chart of the development of the method of the present invention.

The development of the method of the present invention shall be set forth in greater detail with reference to the flow chart shown in FIG. 5. The flow chart shown in FIG. 5 thereby differs from the flow chart shown in FIG. 3 in terms of a few method steps to be set forth below. In addition to the sequence number SN_E (VPI) anticipated for the respective path identifier, the plurality N (VPI) of entries in the cell memory CM present for the respective path identifier VPI is thus additionally co-stored. After a check to determine whether or not an upward transgression of the range R is present, a distinction is made between those instances wherein the sequence number SN_I of the respective cell corresponds to or does not correspond to the anticipated sequence number SN_E. In case the two sequence numbers SN_I and SN_E do not correspond, a count variable S for the plurality of accesses onto the content addressable memory CAM and the plurality N (VPI) are each respectively incremented by one in addition to the entries in the content addressable memory CAM and the entries in the time-exceeding queue TOQ. When the two sequence numbers are identical, that is, when the sequence number of the respective cell corresponds to the anticipated sequence number SN_E, the input address ADR_I is directly entered into the output queue OQ. Over and above this, the marking bit XI is set at the input of the time-exceeding queue and is transferred thereinto together with the respective path identifier VPI. Over and above this, the expected sequence number SN_E is incremented by one. After-following thereupon-the path identifier VPI_O and the appertaining marking bit XO have been read out from the time-exceeding queue, as already presented in FIG. 3 and a determination has been made as to whether or not the marking bit is set. When the marking bit XO is set, an inquiry occurs as to whether or not the additional queue Q is empty. Otherwise, when the marking bit XO is not set, the current path identifier VPI is set equal to the path identifier VPI_O from the time-exceeding queue TOQ. When the additional queue Q is not empty, then the current path identifier VPI receives the path identifier VPI_Q pending at the output of the additional queue Q, as in FIG. 3. Differing from FIG. 3, however, the current path identifier VPI is set equal to the path identifier VPI_I of the respective cell in case of an empty additional queue Q. Following thereupon, an entry is sought (LOOK) in the content addressable memory CAM which has the current path identifier VPI and the appertaining, expected sequence number SN_E (VPI) from the sequence number memory SNM, and a hit signal HIT is generated when such an entry is present. When the marking bit XO is not set and a hit signal HIT was not generated, an error handling EHI, occurs because of a cell loss, as in FIG. 3, the respective expected sequence number SN_E (VPI) is incremented by one in the sequence number memory SNM, and the current path identifier VPI is entered into the further queue Q. Insofar as a hit signal HIT is present, the address ADR (CAM ((SN_E (VPI))) is read out from the sought entry in the content addressable memory CAM into the output queue OQ as in FIG. 3, and the respective expected sequence number SN_E (VPI) is incremented by one in the sequence number memory SNM. Over and above this, the marking bit XO is additionally set at the output of the time-exceeding queue TOQ, the plurality N (VPI) of entries present in the cell memory CM for the respective path identifier VPI is decremented by one and, subsequently, the current path identifier is entered into the further queue Q when the plurality N (VPI) of the entries present for the respective path identifier VPI is greater than or equal to one. When no hit signal HIT is present and the marking bit XO was set, no steps occur between the interrogation of the hit signal HIT and the entry of the current path identifier VPI into the further queue Q. When the plurality N is less than one, the current path identifier VPI is not entered into the further queue Q. Finally, the count variables S for the plurality of accesses to the content addressable memory CAM are incremented by one and, subsequently, the steps between the inquiry as to whether or not the further queue Q is empty and an interrogation of the count variable S are repeated until the count variable S exceeds a plurality n of maximally possible accesses onto the content addressable memory per cell clock. When the plurality n is upwardly transgressed, then the count variable S is set equal to zero, (as shown in FIG. 3), a read address RADR is read out from the output queue OQ and is used for addressing a cell of the cell memory CM to be read out. Following thereupon, a new cell cycle is started (START) if necessary.

The path identifier VPI and the appertaining sequence number SN_E (VPI) of an entering data cell are only entered in the content addressable memory CAM here when the entering sequence number is unequal to that expected for the appertaining path identifier. The sequence number, however, must thereby lie within an acceptance range, otherwise, the cell is recognized as invalid. Entering cells, whose respective sequence number is equal to the expected sequence number, are not entered in the content addressable memory CAM. The address under which the cell is stored in the cell memory CM is then directly written into the output queue OQ. The time-exceeding queue TOQ is then written with every entering cell, as before. Entries that correspond to cells whose input address ADR_I have already been written into the output queue OQ, however, are identified by the marking bit X. For example when X=0, the cell that lead to the entry in the time-exceeding queue TOQ is entered in the CAM and a set marking bit X=1 denotes that the input address ADR_I of the corresponding cell was already entered into the output queue.

For connections having a low data rate whose cells arrive in the proper sequence with high probability, the resequencing control is generally bypassed, that is, the delay caused as a result thereof remains short. For connections having a high data rate, the overtaking probability is high and the average cell spacing is small at the same time in comparison to the running time through the time-exceeding queue TOQ. For such connections, a blocking probability of the method of the present invention that is inadmissibly high results in many instances without the development of the present invention.

For explaining a potentially occurring blocking, bit the sequence number sequence be 5, 4, 6, 7, 8, 9 wherein only the cell having sequence number 5 is out of sequence. The cell having sequence number 5 which arrives first is consequently written into the content addressable memory. The cell having sequence number 4 is recognized as being present in the proper sequence and the corresponding input address ADR_I is written into the output queue OQ via the so-called bypass. The cells that now follow will generally arrive given a high-rate connection before the path identifier entered into the time-exceeding queue TOQ is again read out and the read address RADR of the cell having the sequence number 5 is thus written into the output queue OQ via the abovedescribed content addressable memory access. Since, however, the sequence number of the appertaining connection can only be incremented at this point in time, the following cells having sequence numbers 6, 7, 8, 9 are all marked as occurring out of sequence and are not directly forwarded, even though the sequence numbers arrive in the proper sequence. This example shows that this simple bypass is ineffective by itself for high-rate connections. This is true regardless of how the time-exceeding is monitored. Cells that were intermediately stored for sorting, thus, are only read out from an intermediate memory after a purge date has been reached.

In the development of the method of the present invention, a search procedure is then provided in addition to the accesses onto the content addressable memory CAM initiated by the time-monitoring queue TOQ. This search procedure allows the cells in the content addressable memory that have sequence numbers that are equal to the sequence numbers expected for the respective path identifier to be read out, even though the appertaining path identifier has not yet completely run through the time-monitoring queue TOQ. This can be implemented with reasonable outlay since the content addressable memory is not yet completely utilized without such measures. No CAM access at all would occur, particularly in cell cycles wherein the bypass case arises if no path identifier recognized as valid is additionally read out from the time-exceeding queue TOQ, even though a plurality of content addressable memory accesses, for example two content addressable memory accesses are possible, for example due to the circuit-orientated possibilities. The goal of the search procedure set forth below is to utilize the content addressable memory with optimum efficiency in such cell cycles in order to minimize the plurality of cells that must be read out due to the time-exceeding criterion. The plurality of possible content addressable memory accesses (searching or, respectively, entering) in a cell cycle is thereby referenced n. Unused content addressable memory accesses can then be used in order to look for path identifiers from the further queue Q. In this way, the aboverecited failure mechanism can be avoided in the developed method of the present invention. When the search is successful, then the input address ADRI_I is written into the output queue OQ and the appertaining cell is read out. When the additional queue Q is empty, this being the case, for example, directly after turn-on, then the path identifier of the entering cell is used for unused content addressable memory accesses.

For the implementation of the method of the present invention, the resequencer control RC in FIG. 1, which fundamentally at least contains the elements of FIG. 2 or, respectively, FIG. 4, can be executed in the form of what is referred to as a customized integrated circuit (ASIC), whereby the sequence number SNM, for example, is executed as an external memory, as is the cell memory CM.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for restoring a prescribed sequence for unordered cell streams in asynchronous transfer mode (ATM) switching technology, comprising the steps of:

a first step for supplying a generally unordered cell stream to a cell memory and intermediately storing respectively one cell of said cell stream in a memory area of the cell memory addressed by an input address, the memory area being a content addressable memory;

a second step for reading a sequence number that is expected for a connection having a path identifier of the respective cell, from a sequence number memory, and checking said sequence member to determine if a magnitude of a difference between an expected sequence number and said sequence number of the respective cell is greater than a prescribed range value;

a third step for effecting an indication of a range transgression error, an elimination of the cell, and an entry of a set marking bit into a time-exceeding queue, when said magnitude is greater than the prescribed range value;

a fourth step for entering the input address into the content addressable memory, entering a path identifier of the respective cell into the content addressable memory and into the time-exceeding queue, entering the sequence number of the respective cell into the content addressable memory, and entering a marking bit that is not set into the time-exceeding queue if the range value is not transgressed;

a fifth step for reading a path identifier and an appertaining marking bit from a top of the time-exceeding queue and determining if the marking bit is set;

a sixth step for setting a current path identifier used for addressing the sequence number memory equal to the path identifier from the time-exceeding queue if the marking bit is not set, or alternatively, beginning a new cell cycle if a further queue is empty or, if the further queue is not empty and the marking bit is set, setting the current path identifier equal to a path identifier that is at a top of the additional queue;

a seventh step for seeking an entry in the content addressable memory which has the current path identifier and the appertaining expected sequence number from the sequence number memory, and generating a hit signal when said entry is present; an eighth step for indicating a cell loss error, incrementing the respective expected sequence number in the sequence number memory by one and entering the current path identifier into the further queue when the hit signal indicates no hit;

a ninth step for reading out an address from the sought entry in the content addressable memory into an output queue if a hit signal is present, and incrementing the respective expected sequence number in the sequence number memory by one; and a tenth step for reading out a read address from the output queue and addressing a cell of the cell memory to be read out with said read address and, subsequently, starting a new cell cycle if necessary.

2. The method according to claim 1, wherein a number of the entries in the cell memory present for the respective path identifier is stored in the sequence number memory in addition to a sequence number expected for a respective path identifier wherein, in the second step, the number of entries present in the cell memory for the respective path identifier is additionally read out from the sequence number memory;

wherein a check is carried out before the fourth step to determine if the sequence number of the respective cell coincides with the sequence number of the expected sequence number and wherein the fourth step is supplemented in that a count variable for multiple accesses to the content addressable memory and the number of the entries in the sequence number memory present for the respective path identifier are incremented by one when the sequence number of the respective cell does not coincide with the expected sequence number, and replacing the fourth step in that the respective input address is directly entered into the output queue in that a set marking bit is written into the time-exceeding queue, and in that the respective expected sequence number in the sequence number memory is incremented by one when the sequence number of the respective cell is equal to the expected sequence number;

wherein, as a substitute for the sixth step, the current path identifier is set equal to the path identifier from the time-exceeding queue if the marking bit is not set, or alternatively, the current path identifier is set equal to the path identifier of the respective cell when the further queue is empty, or the current path identifier is set equal to the path identifier that is at the top of the additional queue when the further queue is not empty and if the marking bit is set;

wherein step eight only occurs when the marking bit is not set;

wherein, in the ninth step, the marking bit is additionally set at the output of the time-exceeding queue, the number of the entries present in the cell memory for the respective path identifier is decremented by one and, when the number of entries for the respective path identifier is greater than or equal to one, the current path identifier is subsequently entered into the further queue;

wherein, preceding the tenth step, the count variable for multiple accesses to the content addressable memory is incremented by one and, subsequently, the steps 6–9 are repeated until the count variable exceeds a maximum number of accesses to the content addressable memory per cell clock; and wherein the tenth step is supplemented in that the count variable for multiple accesses is set equal to zero.

3. The method according to claim 1, wherein the input address is transferred into the output queue and a path identifier of the respective cell is entered into the time-exceeding queue together with a set marking bit if the respective cell is composed of a test cell; and wherein a path identifier of the respective cell is entered into the time-exceeding queue together with a set marking bit if the respective cell is composed of an empty cell that is not a test cell.

4. The method according to claim 1, wherein the input address of a respective cell is used as both a write address for the cell memory and a write address for the content addressable memory.

5. A method for restoring a prescribed sequence for unordered cell streams in asynchronous transfer mode (ATM) switching technology, comprising the steps of:

a first step for supplying a generally unordered cell stream to a cell memory and intermediately storing respectively one cell of said cell stream in a memory area of the cell memory addressed by an input address, the memory area being a content addressable memory;

a second step for reading a sequence number that is expected for a connection having a path identifier of the respective cell, from a sequence number memory, and checking said sequence member to determine if a magnitude of a difference between an expected sequence number and said sequence number of the respective cell is greater than a prescribed range value;

a third step for effecting an indication of a range transgression error, an elimination of the cell, and an entry of a set marking bit into a time-exceeding queue, when said magnitude is greater than the prescribed range value;

a fourth step for entering the input address into the content addressable memory, entering a path identifier of the respective cell into the content addressable memory and into the time-exceeding queue, entering the sequence number of the respective cell into the content addressable memory, and entering a marking bit that is not set into the time-exceeding queue if the range value is not transgressed;

a fifth step for reading a path identifier and an appertaining marking bit from a top of the time-exceeding queue and determining if the marking bit is set;

a sixth step for setting a current path identifier used for addressing the sequence number memory equal to the path identifier from the time-exceeding queue if the marking bit is not set, or alternatively, beginning a new cell cycle if a further queue is empty or, if the further queue is not empty and the marking bit is set, setting the current path identifier equal to a path identifier that is at a top of the additional queue;

a seventh step for seeking an entry in the content addressable memory which has the current path identifier and the appertaining expected sequence number from the sequence number memory, and generating a hit signal when said entry is present;

an eighth step for indicating a cell loss error, incrementing the respective expected sequence number in the sequence number memory by one and entering the current path identifier into the further queue when the hit signal indicates no hit;

a ninth step for reading out an address from the sought entry in the content addressable memory into an output queue if a hit signal is present, and incrementing the respective expected sequence number in the sequence number memory by one;

a tenth step for reading out a read address from the output queue and addressing a cell of the cell memory to be read out with said read address and, subsequently, starting a new cell cycle if necessary;

an eleventh step for transferring the input address into the output queue and entering a path identifier of the respective cell into the time-exceeding queue together with a set marking bit if the respective cell is composed of a test cell; and a twelfth step for entering a path identifier of the respective cell into the time-exceeding queue together with a set marking bit if the respective cell is composed of an empty cell that is not a test cell.

6. The method according to claim 5, wherein a number of the entries in the cell memory present for the respective path identifier is stored in the sequence number memory in addition to a sequence number expected for a respective path identifier wherein, in the second step, the number of entries present in the cell memory for the respective path identifier is additionally read out from the sequence number memory;

wherein a check is carried out before the fourth step to determine if the sequence number of the respective cell coincides with the sequence number of the expected sequence number and wherein the fourth step is supplemented in that a count variable for multiple accesses to the content addressable memory and the number of the entries in the sequence number memory present for the respective path identifier are incremented by one when the sequence number of the respective cell does not coincide with the expected sequence number, and replacing the fourth step in that the respective input address is directly entered into the output queue in that a set marking bit is written into the time-exceeding queue, and in that the respective expected sequence number in the sequence number memory is incremented by one when the sequence number of the respective cell is equal to the expected sequence number;

wherein, as a substitute for the sixth step, the current path identifier is set equal to the path identifier from the time-exceeding queue if the marking bit is not set, or alternatively, the current path identifier is set equal to the path identifier of the respective cell when the further queue is empty, or the current path identifier is set equal to the path identifier that is at the top of the additional queue when the further queue is not empty and if the marking bit is set;

wherein step eight only occurs when the marking bit is not set;

wherein, in the ninth step, the marking bit is additionally set at the output of the time-exceeding queue, the number of the entries present in the cell memory for the respective path identifier is decremented by one and, when the number of entries for the respective path identifier is greater than or equal to one, the current path identifier is subsequently entered into the further queue;

wherein, preceding the tenth step, the count variable for multiple accesses to the content addressable memory is incremented by one and, subsequently, the steps 6–9 are repeated until the count variable exceeds a maximum number of accesses to the content addressable memory per cell clock; and wherein the tenth step is supplemented in that the count variable for multiple accesses is set equal to zero.

7. The method according to claim 4, wherein the input address of a respective cell is used as both a write address for the cell memory and a write address for the content addressable memory.

8. A method for restoring a prescribed sequence for unordered cell streams in asynchronous transfer mode (ATM) switching technology, comprising the steps of:

a first step for supplying a generally unordered cell stream to a cell memory and intermediately storing respectively one cell of said cell stream in a memory area of the cell memory addressed by an input address, the memory area being a content addressable memory;

a second step for reading a sequence number that is expected for a connection having a path identifier of the respective cell, from a sequence number memory, and checking said sequence member to determine if a magnitude of a difference between an expected sequence number and said sequence number of the respective cell is greater than a prescribed range value;

a third step for effecting an indication of a range transgression error, an elimination of the cell, and an entry of a set marking bit into a time-exceeding queue, when said magnitude is greater than the prescribed range value;

a fourth step for entering the input address into the content addressable memory, entering a path identifier of the respective cell into the content addressable memory and into the time-exceeding queue, entering the sequence number of the respective cell into the content addressable memory, and entering a marking bit that is not set into the time-exceeding queue if the range value is not transgressed;

a fifth step for reading a path identifier and an appertaining marking bit from a top of the time-exceeding queue and determining if the marking bit is set;

a sixth step for setting a current path identifier used for addressing the sequence number memory equal to the path identifier from the time-exceeding queue if the marking bit is not set, or alternatively, beginning a new cell cycle if a further queue is empty or, if the further queue is not empty and the marking bit is set, setting the current path identifier equal to a path identifier that is at a top of the additional queue; a seventh step for seeking an entry in the content addressable memory which has the current path identifier and the appertaining expected sequence number from the sequence number memory, and generating a hit signal when said entry is present;

an eighth step for indicating a cell loss error, incrementing the respective expected sequence number in the sequence number memory by one and entering the current path identifier into the further queue when the hit signal indicates no hit;

a ninth step for reading out an address from the sought entry in the content addressable memory into an output queue if a hit signal is present, and incrementing the respective expected sequence number in the sequence number memory by one;

a tenth step for reading out a read address from the output queue and addressing a cell of the cell memory to be read out with said read address and, subsequently, starting a new cell cycle if necessary; and an eleventh step for using the input address as a write address for the cell memory and a write address for the content addressable memory.

9. The method according to claim 8, wherein a number of the entries in the cell memory present for the respective path identifier is stored in the sequence number memory in addition to a sequence number expected for a respective path identifier wherein, in the second step, the number of entries present in the cell memory for the respective path identifier is additionally read out from the sequence number memory;

wherein a check is carried out before the fourth step to determine if the sequence number of the respective cell coincides with the sequence number of the expected sequence number and wherein the fourth step is supplemented in that a count variable for multiple accesses to the content addressable memory and the number of the entries in the sequence number memory present for the respective path identifier are incremented by one when the sequence number of the respective cell does not coincide with the expected sequence number, and replacing the fourth step in that the respective input address is directly entered into the output queue in that a set marking bit is written into the time-exceeding queue, and in that the respective expected sequence number in the sequence number memory is incremented by one when the sequence number of the respective cell is equal to the expected sequence number;

wherein, as a substitute for the sixth step, the current path identifier is set equal to the path identifier from the time-exceeding queue if the marking bit is not set, or alternatively, the current path identifier is set equal to the path identifier of the respective cell when the further queue is empty, or the current path identifier is set equal to the path identifier that is at the top of the additional queue when the further queue is not empty and if the marking bit is set;

wherein step eight only occurs when the marking bit is not set;

wherein, in the ninth step, the marking bit is additionally set at the output of the time-exceeding queue, the number of the entries present in the cell memory for the respective path identifier is decremented by one and, when the number of entries for the respective path identifier is greater than or equal to one, the current path identifier is subsequently entered into the further queue;

wherein, preceding the tenth step, the count variable for multiple accesses to the content addressable memory is incremented by one and, subsequently, the steps 6–9 are repeated until the count variable exceeds a maximum number of ? accesses to the content addressable memory per cell clock; and wherein the tenth step is supplemented in that the count variable for multiple accesses is set equal to zero.

10. The method according to claim 8, wherein the input address is transferred into the output queue and a path identifier of the respective cell is entered into the time-exceeding queue together with a set marking bit if the respective cell is composed of a test cell; and wherein a path identifier of the respective cell is entered into the time-exceeding queue together with a set marking bit if the respective cell is composed of an empty cell that is not a test cell.

\* \* \* \* \*